United States Patent
Kurzer et al.

(10) Patent No.: US 9,269,028 B2
(45) Date of Patent: Feb. 23, 2016

(54) SYSTEM AND METHOD FOR DETERMINING STRING SIMILARITY

(71) Applicant: General Electric Company, Schenectady, NY (US)

(72) Inventors: Jake Matthew Kurzer, Glen Allen, VA (US); Brett Csorba, Glen Allen, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/324,755

(22) Filed: Jul. 7, 2014

(65) Prior Publication Data

US 2016/0004937 A1 Jan. 7, 2016

(51) Int. Cl.
*G06K 9/72* (2006.01)
*G06K 9/62* (2006.01)

(52) U.S. Cl.
CPC *G06K 9/72* (2013.01); *G06K 9/626* (2013.01); *G06K 9/6215* (2013.01)

(58) Field of Classification Search
CPC ............................ G06F 19/22; G06F 2207/025
USPC ......................................................... 382/229
See application file for complete search history.

(56) References Cited

U.S. PATENT DOCUMENTS

2005/0187916 A1* 8/2005 Levin ........................ G06F 7/02

OTHER PUBLICATIONS

Navarro, Gonzalo, A Guided Tour to Approximate String Matching, ACM Computing Surveys, vol. 33, No. 1, Mar. 2001, pp. 31-88.

* cited by examiner

*Primary Examiner* — Manuchehr Rahmjoo
(74) *Attorney, Agent, or Firm* — Jean K. Testa; Fletcher Yoder, P.C.

(57) ABSTRACT

Provided are string similarity assessment techniques. In one embodiment, the techniques include receiving a plurality of input strings comprising characters from a character set and generating hashtables for each respective input string using a hash function that assigns the characters as keys and character positions in the strings as values. The techniques may also include determine a character similarity index for at least two of the input strings relative to each other by comparing a similarity of the values for each key in the their respective hashtables; determining a total disordering index based representative of an alignment of the at least two input strings by determining differences between a plurality of index values for each individual key in their respective hashtables and determining the total disordering index based on the differences; and determining a string similarity metric based on at least one character similarity index and the total disordering index.

20 Claims, 2 Drawing Sheets

Key   Vals
| a | 0 | 1 | 3 |
| b | 2 | 4 |
| c | 5 |
FIG. 3
Key   Vals
| a | 2 |
| b | 0 | 3 |
| d | 1 | 4 | 5 |
FIG. 4
| c | 2 |
| d | 0 | 1 | 3 |
FIG. 5
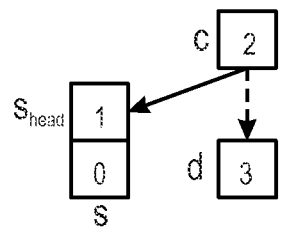
FIG. 6
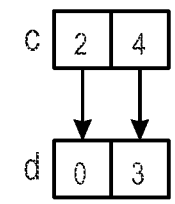
FIG. 7

SYSTEM AND METHOD FOR DETERMINING STRING SIMILARITY

BACKGROUND

The subject matter disclosed herein relates to assessments of string similarity, and more particularly, to techniques for determining a similarity or distance between character strings and providing metrics of similarity or distance.

While numeric data is easy to compare and correlate, the same cannot be said for character strings. For example, techniques to compare strings must assess if cat is similar to bat and how similar both are to chat. The approach used to determine this similarity can be defined by the edit distance or the number of character insertions, deletions, and transpositions to transform one character string to another. This edit distance is also known as Damerau-Levenshtein distance. While this metric produces useful measures of similarity, algorithms traditionally used to compute this distance have a O(nm) running time, where m and n are the length of the input strings. Faster running algorithms do exist that run in linear time, but these algorithms are limited by aspects such as machine word size or limit the range of the input strings they can operate on.

BRIEF DESCRIPTION

Provided herein are methods for string similarity assessment. One embodiment includes using a processor-based device and generating a first hashtable using a hash function for a first input string comprising characters from a character set; generating a second hashtable using the hash function for a second input string comprising characters from the character set, wherein, for the first hashtable and the second hashtable, the hash function assigns the characters as keys and character positions in the strings as values; determining a character similarity index for each of the first input sting and the second input string based on comparing a similarity of the values for each key in the first hashtable and the second hashtable; determining a string similarity index by selecting the character similarity index for the first input sting or the second input string; determining a total disordering index representative of an alignment score of each key in the first hashtable with its respective key in the second hashtable; and determining a string similarity metric based on the string similarity index and the total disordering index.

Another embodiment provides a string similarity assessment system. The system includes a memory storing instructions that, when executed, are configured to: receive a plurality of input strings comprising characters from a character set; generate hashtables for each respective input string using a hash function that assigns the characters as keys and character positions in the strings as values; determine a character similarity index for at least two of the input strings relative to each other by comparing a similarity of the values for each key in the their respective hashtables; determining a total disordering index based representative of an alignment of the at least two input strings by determining differences between a plurality of index values for each individual key in their respective hashtables and determining the total disordering index based on the differences; and determining a string similarity metric based on at least one character similarity index and the total disordering index; and one or more processors configured to execute the instructions.

Another embodiment includes a string similarity assessment method. The method includes the steps of receiving a plurality of input strings comprising characters from a character set; generating hashtables for each respective input string using a hash function that assigns the characters as keys and character positions in the strings as values; determining a character similarity index for at least two of the input strings relative to each other by comparing a similarity of the values for each key in the their respective hashtables; determining a total disordering index based representative of an alignment of the at least two input strings by determining differences between a plurality of index values for each individual key in their respective hashtables and determining the total disordering index based on the differences; and determining a string similarity metric based on at least one character similarity index and the total disordering index.

DRAWINGS

These and other features, aspects, and advantages of the present invention will become better understood when the following detailed description is read with reference to the accompanying drawings in which like characters represent like parts throughout the drawings, wherein:

FIG. 3 is a example of a hashtable for a hypothetical string aababc, in accordance with an embodiment;

FIG. 4 is a example of a hashtable for a hypothetical string bdabdd, in accordance with an embodiment;

FIG. 5 is an example of a character alignment for the character set "a" for aligning the hashtables in FIGS. 3 and 4, in accordance with an embodiment;

FIG. 6 is an example of a disordering index determination based on the alignment of FIG. 5, in accordance with an embodiment; and FIG. 7 is an example of a disordering index determination based on a character alignment for "b", in accordance with an embodiment;

DETAILED DESCRIPTION

Figure 1:
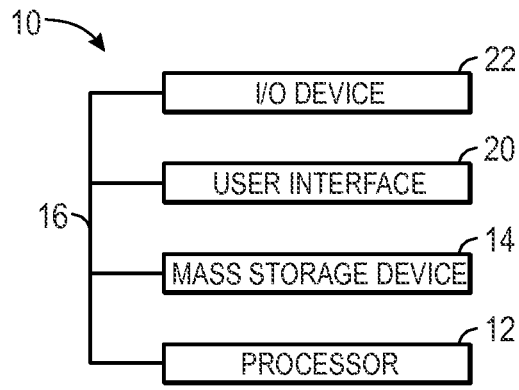
FIG. 1 is a block diagram depicting a system that incorporates the string similarity techniques in accordance with an embodiment.

Techniques for the comparison of character strings may be useful in a variety of settings. For example, in the field of bioinformatics, researchers may wish to assess the similarity of two or more DNA sequences to locate any changes associated with mutations or polymorphisms. In particular, two DNA sequences (e.g., sequences from different cells in a tumor or from different individuals) may be very similar, but may differ from one another by substitutions, deletions, or transpositions in order of the nucleotides. These differences may result in protein translation errors that in turn result in observable phenotypes associated with disease or adverse clinical conditions (or, alternatively, clinical benefits). Accordingly, researchers may wish to have tools to assess the similarity of DNA sequences and that take into account such single character differences that may have significant clinical implications. However, certain techniques, while being able to robustly handle substitutions or deletions, may have difficulty assessing the similarity of transpositions, i.e., two characters switched in position. In the example of a transposition, the character identities are the same but the positions are different. For example, certain techniques may not properly weight transpositions, resulting in a transposition weighted as being too dissimilar and, indeed, less alike than more dissimilar strings.

The present techniques provide a more accurate string similarity assessment by incorporating computations similar to edit distance computations and by assuming that transpositions are neutral in the sense of pure shannon entropy to achieve a linear time operation. For example, such techniques may provide similarity assessments that may at least in part be expressed as a "distance" or "edit distance" between two or more strings, which may include a distance of zero representing identical strings and with increasing distances representing more and more dissimilar strings. The distance may also be considered in terms of the number of edits required to transform one string into another. For identical strings, no edits are required. For a string with a single change relative to another, a single edit is required for such a transformation. In addition to providing distance metrics as part of similarity assessment, the resulting factors are used to calculate the maximum possible sum of character offsets. By computing a ratio of the similarity factors in terms of maximum possible similarity, embodiments of the disclosure result in a metric that rewards similar configurations based on how much less than maximally disordered they are with respect to each string involved. The techniques provide the benefits of faster execution as well as decreased memory usage by operating in a strictly linear fashion across the memory space, which renders it suitable for operating on extremely large data sets such as DNA sequences. The approach satisfies the triangle inequality, and thus defines a usable metric space for broader investigation in computational geometry and adjacent fields. Variations to the construction of the similarity metric may be used to adjust the properties of this metric space and ease computability, reducing processing time and costs.

The present techniques may be incorporated into processor-based system for providing string similarity metrics. FIG. 1 illustrates one embodiment of a system 10 intended to represent a broad category of computer systems such as personal computers, workstations, and/or embedded systems that may be used in conjunction with the present techniques. In the embodiment illustrated in FIG. 1, hardware components of the system 10 may include a processor 12 and mass storage device 14 coupled to high speed bus 16. A user interface device 20 may also be coupled to the bus 16. Examples of a suitable interface device 20 may include a display device, a keyboard, one or more external network interfaces, etc. An input/output device 22 may also be coupled to the bus 16. In an embodiment, the user interface device 20, for example the display, may communicate certain information related to the status of the operation of the string similarity assessment. For example, the display may display information relating to numeric outputs of string similarity metrics.

Certain embodiments may include additional components, may not require all of the above components, or may combine one or more components. For instance, the mass storage device 14 may be on-chip with processor 12. Additionally, the mass storage device 14 may include an electrically erasable programmable read only memory (EEPROM), wherein software routines for string similarity assessment are executed in place from the EEPROM. Some implementations may employ a single bus, to which all of the components are coupled, or one or more additional buses and bus bridges to which various additional components can be coupled. Additional components may include additional processors, a CD-ROM drive, additional memories, and other peripheral components.

The system 10 may be used to input or interface with potential string queries as well as provide an interface for viewing and manipulating the results of string similarity assessments. Strings or character strings as provided herein may refer to an ordered collection of letters. For example, a character string may be a nucleotide sequence that includes one or more naturally-occurring nucleotides (A,T,C,G,U) or representations of variable nucleotide sequences (R,Y,S,W, K,M,B,D,H,V,N) and may also include synthetic nucleotides (X,Y). In one embodiment, the strings may only include characters associated with DNA (A,T,C,G) or only with mRNA (A,U,C,G) Accordingly, the system 10 may be configured to provide an output of similarity for two input nucleotide strings. Such assessments may be used to determine if any mutations exist in the sequences or if the sequences are derived from the same organism. In addition, the present techniques may be used to assess protein similarity, using string inputs that include single letter amino acid codes. In other embodiments, the techniques may be used in computing similarity of a variety of string types including URLs, IPs, and machine produced strings, allowing for use on strings which are left hierarchical, right hierarchical, and non-hierarchical. Such approaches of finding string similarity may be used to find patterns in phishing emails, evaluate network topology, and determine attack patterns on large scale data encompassing tens of thousands of string of variable lengths and hierarchies. In certain embodiments, phishing emails may incorporate URLs that are extremely similar (e.g., that differ by one character) from the sites they hope to mimic. The present techniques may be used to assess the similarity of strings in incoming email communication by performing a string search of the email contents relative to known URLs (banks, retail, etc.). Emails with strings with extremely similar (e.g. similar but nonidentical) strings to known URLs may be marked as junk. The techniques may also be used in the context of data security to determine if a credit card number is fraudulent by comparing a potential card number to known numbers.

The outputs of the similarity assessment may be metrics or numeric values representative of similarity and/or dissimilarity. In one embodiment, the string similarity technique compares two or more strings and returns a floating point value in the range of [0 1], 0 indicating perfect similarity and 1 indicating maximum dissimilarity. The techniques provided herein may be used to determine string similarity resulting in orders that strongly approximate traditional edit distance calculations while running in linear O(m+n) time, where m and n are related to the lengths of the strings being compared. This is achieved through linear preprocessing steps of input strings that can be stored for future string comparisons and linear character comparison steps. Accordingly, longer strings may be preprocessed only once, and the preprocessed data may be accessed from memory in future analyses, which in turn saves computation time. In addition, the techniques provided herein return similarity values which will satisfy the triangle inequality, allowing for pruning and sweep line approaches when dealing with large data sets. The triangle inequality theorem sets forth that for any triangle, the sum of the lengths of any two sides must be greater than or equal to the length of the remaining side. This satisfaction allows for the use of certain clustering techniques using this metric. Accordingly, the present techniques may use assessed similarity metrics for certain strings to determine bounds on similarity for new queries, which in turn reduces the total number of distance computations within larger data sets.

Figure 2:
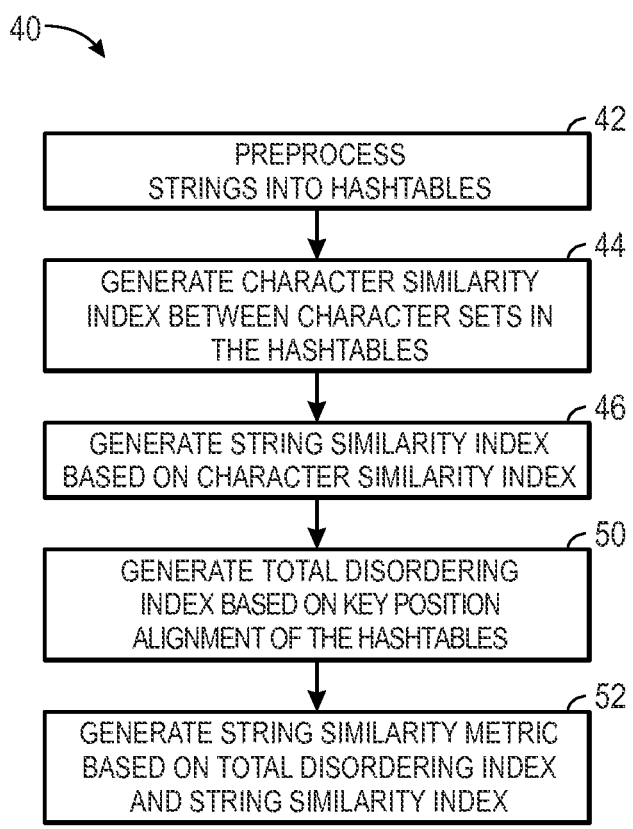
FIG. 2 is a flow diagram of a string similarity assessment technique, in accordance with an embodiment.

FIG. 2 is a flow diagram of a technique for implementing the string similarity assessment as provided herein. In one embodiment, a string similarity assessment method 40 may first include one or more string preprocessing steps. For example, such steps may include preprocessing each of the input strings into a data structure which allows the algorithm to find indexes of characters within each string. In one embodiment, the strings are preprocessed into a hashtable structure. These structures can be stored in hashtable structures in the memory (e.g., mass storage device 14) and may be accessed for future queries of the string in question, preventing this step from being repeated for future comparisons against the input strings. Accordingly, for each input string s contains the character set C, a hashtable is generated (block 42). The hash function assigns the characters as keys and character positions in the strings as values. In one embodiment, once the hashtable h is generated for each string, it may be stored and the original input string may be discarded, which may help with memory allocation. In particular, the hashtable function may also determine for each letter $s_i$ in s which is equivalent to the character c, if h contains the key c. If it does not, a new list l is created containing the index i of $s_i$ as the value of key c. If it does, append i to the end of the list l at key c. As i is always increasing, l will be in sorted order. Assuming O(l) insertions, accesses, and edits for h and O(l) inserts into l, a string of length m can be preprocessed in O(m) time.

For the generated hashtables, a character similarity index is created (block 44) that represents the similarity between the respective character sets in the hashtables. If the first string is A and the second string is B, the character similarity may be assessed for A as compared to B (or B to A) to generate $S_A$ or $S_B$. These two similarities are used to calculate the combined string similarity index $S_{AB}$. In addition to the string similarity index, a total disordering index may be generated (block 50) based on aligning the positions (values) of the characters (keys) of the hashtable data. The total disordering index represents a measure of the position changes for similar characters. For example, xxyxx and yxxxx have identical character sets, but these strings represent differences in character order/position. The total disordering index provides a metric representing such differences. The method 40 also may provide a single string similarity metric (block 52) based on the string similarity index and the total disordering index and representative of similarity of both of these individual metrics.

Accordingly, the system 10 may compute and provide one or more outputs generated by the method 40, including the character similarity in string A ($S_A$), character similarity in string B, ($S_B$), the combined string similarity index ($S_{AB}$), and total disordering (D). Such outputs may be numeric values and may be displayed on a display of the system 10. Alternatively or additionally, the outputs may be stored for later analysis or consideration. Further, the outputs may be provided to downstream processing techniques. For example, in one embodiment, the indices may be used for data mining, whereby only strings with similarity above or below predetermined thresholds of one or more of the index outputs of the present techniques are retained while other strings are not selected. In this manner, strings that are very similar may be retained in particular contexts and strings that are dissimilar may be retained in other contexts, depending on the desired results.

FIG. 3 is an example of a hashtable structure a for a string A=aababc. In the depicted hashtable, the key a has values 0, 1, 3; key b has values 2,4; and key c has value 5, with 0 representing the first character in the string. FIG. 4 is an example of a hashtable structure b for a string B=bdabdd. In the depicted hashtable, key a has values 2; key b has values 0,3; and key d has values 1,4; and 5.

First, each character $c_a$ in a is evaluated. If b does not contain $c_a$, then add 1 to $S_A$, which is the character similarity index of string A. If b contains $c_a$, while the character similarity may be identical (e.g., zero difference), there may be a disordering index output. For example, the strings may have the same characters, but at different positions. Such an assessment assigns the shorter list c and the longer list d where c and d are ordered. For example, FIG. 5 shows lists c and d for the character "a" in strings A and B. Here, the shorter list of the character "a" is found in string B, where this character has only one value. Accordingly, in this example, c represents character "a" in string B. Further, list d represents character "a" in string A, which has three values. For each index $c_i$ in c, the first element in d that is greater than $c_i$ is found by iterating through d. For each element in d that is less than or equal to $c_i$, push this element onto a stack s. As shown in FIG. 6, based on this alignment, a difference between c and d may be found. Via iteration, the d list value 3 is greater than the c list value 2. Accordingly, the remaining values 1 and 0 are pushed into the stack s. If the total number of remaining indexes in c and d are equal and the stack is empty, this means that the smallest possible disordering would be to pair $c_1 \rightarrow d_1$; $c_2 \rightarrow d_2$; ...; $c_n \rightarrow d_n$. Then, add to D the absolute value of $c_1 - d_1$; $c_2 - d_2$; ...; $c_n - d_n$. There are no more letters then in c to process. If not, compare $|d_j - c_i|$ to $c_i - s_{head}$. The smaller value is the index that is the closest to $c_i$. Add this value to D. If this is $d_j$, remove $d_j$ from d so it is no longer evaluated. If this is $s_{head}$, pop this from s. Continue to process the remaining $c_i$ in c in this way, keeping track of the current index in d and s during processing. After all remaining $c_i$ have been processed, d and s may still contain indexes. Add 1 to $S_A$ for each letter remaining in d and in s if a=d or to $S_B$ if b=d. Add the count of $c_b$ not an element of d to $S_A$ if a=c or to $S_B$ if b=c. FIG. 7 shows the alignment of $c_b$ for the character b in which b is at values 2,4 and 0,3 respectively. In the case where the length of $c_b$ in a and b are equal, c and d can be assigned either c=a and d=b or c=b and d=a.

In this approach, each $c_A$ is touched once for a total of m times and each $c_B$ is touched at most twice for a total of 2n times. This means this step will run in O(m+2n) or O(m+n). The conclusion of this step yields the two measures of similarity, $S_A$ and $S_B$. The greater value is equal to the least possible number of character insertions/deletions/replacements to transform A into B. Set $S_{AB}$ to this greater value.

Given the above measure of $S_{AB}$ and D, this gives end users two important measures in which unique similarity algorithms can be assessed. The metric takes equally into account $S_{AB}$ and D. In particular embodiments, the string similarity metric may be determined by one or more of the following equations, where m equals the length of the longer string:

$$1 - (\%Ordered)(\%SimilarChars) \quad \text{(Equation 1)}$$

$$1 - (maxDisordering - D/maxDisordering) \quad \text{(Equation 2)}$$
$$(maxDissimilarChars - S_{AB}/maxDissimilarChars)$$

$$1 - \left( \frac{\left| \left| \frac{m^2}{2} + 1 \right| - D \right|}{\left| \frac{m^2}{2} + 1 \right|} * \frac{m - s_{AB}}{m} \right) \quad \text{(Equation 3)}$$

For example, equation 3 incorporates $S_{AB}$ and D to determine a numeric metric that is a measure of string similarity between two strings. It should be understood that the present techniques may be incorporated at any scale, and may be used to assess two or more strings relative to one another.

In particular embodiments, the system 10 may be configured to operate according to the following pseudo code, which may be stored in the mass storage device 14 and executed by the processor 12.

```
/**
*Creates a similarity object. This object will store a hash table of
* already compared strings in order to prevent re-hashing of repeated string.
*
* @constructor
*/
function CKSimilarity( ){
    this.hashedStrings = new Object( );
}
/**
* Transforms inputted strings to hashtable representations and stores them
* in the object's hashtable if that object has not already been hashed.
* These tables contains the unique chars in each string as keys and arrays
* representing each char's positions in the string as vals.
*
* @param {string} string String to hash.
* @return {Object} Objects representing the string as a hashtable.
*/
CKSimilarity.prototype.hashString = function(string){
    if (this.hashedStrings[string] === undefined){
        this.hashedStrings[string] = new Object( );
        for (var y = 0; y < string.length; ++ y){
            var currentChar = string.charAt(y);
            // If letter has not occurred yet, create a
            // new array at that key
            if (this.hashedStrings[string][currentChar] === undefined){
                this.hashedStrings[string][currentChar] = new Array( );
            }
            this.hashedStrings[string][currentChar].push(y);
        }
    }
    return this.hashedStrings[string];
}
/**
* Compares two strings by their similarity and letter ordering.
*
* @param {string} x The first string to compare.
* @param {string} y The second string to compare.
* @return {number} A number between 0 and 1 measuring the
strings similarity.
*       0 is perfectly similar.
*       1 is the measure of max dissimilarity.
*/
CKSimilarity.prototype.getSimilarity = function(x, y){
    // Hashes input strings
    var stringX = this.hashString(x);
    var stringY = this.hashString(y);
    var charSimS1 = 0;
    var charSimS2 = 0;
    var charSim = 0;
    var charOrd = 0;
    var longestLength = Math.max(x.length, y.length);
    // Processes each letter in the first string
    for (var letter in stringX){
        //Always sets s1 to the shorter array of letter positions
        if (!(stringY[letter] === undefined)){
            var s1;
            var s2;
            if (stringX[letter].length < stringY[letter].length){
                s1 = stringX[letter];
                s2 = stringY[letter];
            }
            else{
                s1 = stringY[letter];
                s2 = stringX[letter];
            }
            var s1Index = 0;
            var s2Index = 0;
            var s2PassedIndexes = new Array( );
            var s2PassedIndexesLength = 0;
            // While there are still letters in s1 to process
            while (s1Index < s1.length){
                var head = [s1Index];
                // Index the current index of s2 to the first letter position that
                // is greater than the current letter position in s1, or the farthest
                // we can go in s2 while still having enough letter left to compare
                to s1.
                // Places skipped over positions into a storage array.
                while (s2Index < s2.length-(s1.length-s1Index) &&
                s2[s2Index] < head){
                    s2Passedindexes.push(s2Index);
                    ++s2PassedIndexesLength;
                    ++s2Index;
                }
                // If the remaining positions in s1 and s2 are equal
                if (s2Index === s2.length-(s1.length-s1Index)){
                    while (s2Index < s2.length){
                        head = s1[s1Index];
                        charOrd += Math.abs(head - s2[s2Index]);
                        ++s1Index;
                        ++s2Index;
                    }
                    break;
                }
                // Else process which position in s2 is closer to the current
                // position in s1
                else{
                    var v1 = Number.MAX_VALUE;
                    if (s2PassedIndexesLength > 0)
                        v1 = head - s2[s2PassedIndexes[s2PassedIndexeslength-1]];
                    var v2 = s2[s2Index] - head;
                    if (v1 <= v2){
                        charOrd += v1;
                        --s2Passedindexeslength;
                    }
                    else{
                        charOrd += v2;
                        ++s2Index;
                    }
                }
                ++s1Index;
            }
            // Process all remaining characters in s2
            for (var z = s2Index; z < s2.length; ++z){
                if (stringX[letter].length > stringY[letter].length)
                    charSimS1+= 1;
                else
                    charSimS2 += 1;
            }
            // Process all passed over characters
            for (var z = s2PassedIndexesLength - 1; z >= 0; --z){
                if (stringX[letter].length > stringY[letter].length)
                    charSimS1+= 1;
                else
                    charSimS2 += 1;
            }
        }
        // Process all letters in s1 and not in s2
        else{
            for (var z = 0; z < stringX[letter].length; ++z){
                charSimS1 += 1;
            }
        }
    }
    // Process all letters in s2 and not in s1
    for (var letter in stringY){
        if (stringX[letter] === undefined){
            for (var z = 0; z < stringY[letter].length; ++z){
                charSimS2 += 1;
            }
        }
    }
    // Char sim is the greatest number of character insertions/deletions/
    replacements
    // to get between s1 and s2
    if (charSimS1 > charSimS2)
        charSim = charSimS1;
```

-continued

```
    else
        charSim = charSimS2;
    // Return function
    return 1-((Math.floor(longestLength*longestLength/2+1)-
charOrd)/Math.floor(longestLength*longestLength/2+1)*(longestLength-
charSim)/longestLength);
}
```

Accordingly, the system 10 may include stored executable instructions configured to generate and/or store a hashtable for each input string. In addition, the system 10 may include stored executable instructions for comparing two strings by similarity and character ordering.

The disclosed embodiments provide a string similarity assessment system with reduced computational and memory requirements that has improved similarity metrics and that robustly handles transpositions by assuming these are neutral. Further, the techniques are also relatively more robust than techniques that are dynamic in nature and that track edits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A string similarity assessment method, comprising:
using a processor-based device;
generating a first hashtable using a hash function for a first input string comprising characters from a character set;
generating a second hashtable using the hash function for a second input string comprising characters from the character set, wherein, for the first hashtable and the second hashtable, the hash function assigns the characters as keys and character positions in the strings as values;
determining a character similarity index for each of the first input sting and the second input string based on comparing a similarity of the values for each key in the first hashtable and the second hashtable;
determining a string similarity index for transforming the first string into the second string by selecting the character similarity index for the first input sting or the second input string;
determining a total disordering index representative of an alignment score of each key in the first hashtable with its respective key in the second hashtable; and
determining a string similarity metric based on the string similarity index and the total disordering index.

2. The method of claim 1, comprising storing the first hashtable and the second hashtable.

3. The method of claim 1, wherein the character set comprises the characters A,C,T, and G.

4. The method of claim 3, wherein the character set comprises only the characters A,C,T, and G.

5. The method of claim 1, comprising displaying, using a display, one or more of the string similarity metric, the string similarity index, or the total disordering index.

6. The method of claim 1, wherein determining the string similarity metric based on the string similarity index and the total disordering index comprises using a length value of the first input string or the second input string.

7. The method of claim 1, wherein determining the character similarity index for the first input sting comprises determining if each key in the first input string is present in the second input string, and, for each individual key that is not present in the second input string, adding a predetermined score to the character similarity index for the first input string.

8. The method of claim 7, wherein determining the character similarity index for the second input sting comprises determining if each key in the second input string is present in the first input string, and, for each individual key that is not present in the first input string, adding a predetermined score to the character similarity index for the second input string.

9. The method of claim 8, comprising selecting a greater of the character similarity index for the first input sting and the character similarity index for the second input sting as the string similarity index.

10. The method of claim 1, wherein determining the total disordering index comprises comparing a length of a list of index values of each key for the first hashtable and the second hashtable and setting a shortest list of each key as a base list and a longer list of each key as the comparison list.

11. The method of claim 10, comprising, for each base list of each key, comparing the base list to the comparison list by determining a difference between a first index value in the comparison list that is greater than a first index value in the base list.

12. The method of claim 10, comprising, determining two difference values for each index value in the base list, wherein each index value in the base list is subtracted from only two index values in the comparison list.

13. The method of claim 10, comprising, selecting a smaller of the two difference values for each index value in the base list and determining the total disordering index by summing the selected difference values.

14. A string similarity assessment system, comprising:
a memory storing instructions that, when executed, are configured to:
receive a plurality of input strings comprising characters from a character set;
generate hashtables for each respective input string using a hash function that assigns the characters as keys and character positions in the strings as values;
determine a character similarity index for at least two of the input strings relative to each other by comparing a similarity of the values for each key in the their respective hashtables;
determining a total disordering index based representative of an alignment of the at least two input strings by determining differences between a plurality of index values for each individual key in their respective hashtables and determining the total disordering index based on the differences; and
determining a string similarity metric based on at least one character similarity index and the total disordering index; and
one or more processors configured to execute the instructions.

15. The system of claim 14, wherein the instructions are configured to store the hashtables.

16. The system of claim 14, wherein the instructions are configured to provide an indication of the string similarity metric.

17. The system of claim 14, wherein the instructions are configured to provide a security assessment based on the string similarity metric.

18. The system of claim 14, comprising displaying, using a display, the string similarity metric.

19. The system of claim 14, wherein the string similarity metric is determined by the following equation:

$$1 - \left( \frac{\left|\frac{m^2}{2} + 1\right| - o}{\left|\frac{m^2}{2} + 1\right|} * \frac{m - s_{AB}}{m} \right)$$

where m is a length of the longer string of the at least two strings, where o is the total disordering index, and wherein $s_{AB}$ is a greater of the character similarity indices for at least two of the input strings.

20. A string similarity assessment method, comprising:
using a processor-based device:
  receiving a plurality of input strings comprising characters from a character set;
  generating hashtables for each respective input string using a hash function that assigns the characters as keys and character positions in the strings as values;
  determining a character similarity index for at least two of the input strings relative to each other by comparing a similarity of the values for each key in their respective hashtables;
  determining a total disordering index based representative of an alignment of the at least two input strings by determining differences between a plurality of index values for each individual key in their respective hashtables and determining the total disordering index based on the differences, and
  determining a string similarity metric based on at least one character similarity index and the total disordering index.

* * * * *